July 17, 1962 N. H. KENT ET AL 3,044,153
MANUFACTURE BY EXTRUSION OF TURBINE ENGINE BLADES
Filed Oct. 10, 1957
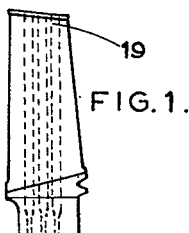
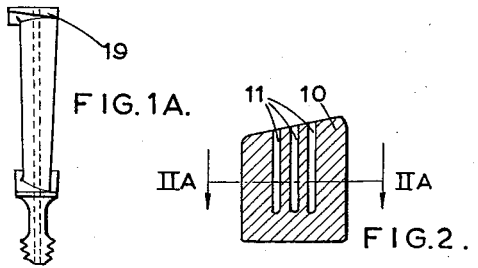
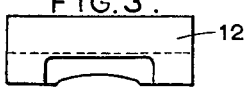
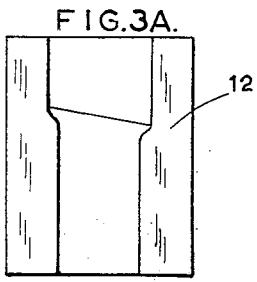
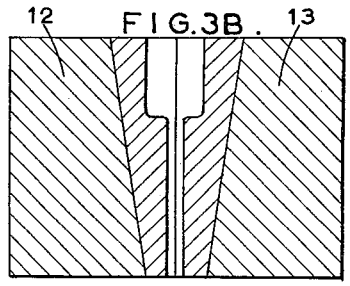
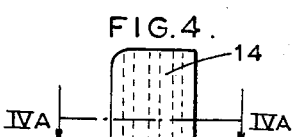
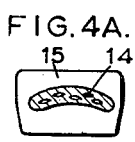
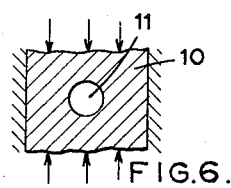
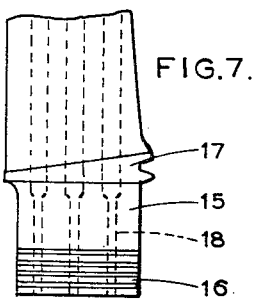
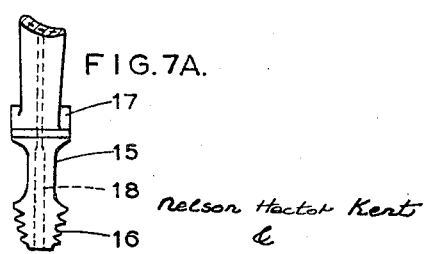
Nelson Hector Kent
&
George Oswald Eccles
INVENTORS
BY Leech & Radue
ATTORNEYS

United States Patent Office 3,044,153
Patented July 17, 1962

3,044,153
MANUFACTURE BY EXTRUSION OF TURBINE
ENGINE BLADES
Nelson Hector Kent, Allestree, and George O. Eccles, Barrowford, England, assignors to Rolls-Royce Limited, Derby, England, a British company
Filed Oct. 10, 1957, Ser. No. 689,440
Claims priority, application Great Britain Oct. 12, 1956
3 Claims. (Cl. 29—156.8)

This invention relates to the manufacture of blades and particularly turbine blades for internal combustion turbine engines from metals which are resistant to high temperatures such as nickel-chrome alloys.

The invention provides a method of manufacturing blades of the type which have a root fixing portion, a blade portion twisted or off set from the root fixing portion and cooling passageways running lengthwise of the blade having open ends at the blade root and blade tip.

According to this invention the method of forming a blade of the said type includes the following steps:

(a) Producing a billet,
(b) Drilling a plurality of holes axially of the billet,
(c) Inserting filler material into the drilled holes,
(d) Partially extruding the billet in a die with lubrication by pressure exerted substantially along one diameter only of each of the said drilled holes thereby to produce a blade section of approximate aerodynamic form leaving an integral portion of the billet remaining to form the root-fixing portion, said holes thereby being deformed in the profile portion to be of elongated or lenticular cross-section,
(e) Twisting the profile portion to give the required angle of incidence,
(f) Machining the blade profile portion to final shape and machining the root-fixing portion from the remaining non-extruded portion of the billet, and
(g) Removing said filler at a stage in the manufacturing process subsequent to extrusion.

The billet may be initially of substantially rectangular cross section in which case deformation during extrusion will take place substantially wholly between two opposite faces of the rectangular section.

The twisting of the profile portion of the blade may be carried out after extrusion or in the process of the extrusion.

Preferably the holes are blind holes which extend initially only through the blade portion of the billet and holes to register with them are drilled after extrusion through the root portion of the billet.

If desired an integral root platform may be formed on the blade. Where this platform is inclined the extrusion die will have a correspondingly inclined part and the billet be formed by the extrusion with a complementary inclined surface. The blade profile portion may have a tip platform which can be in the form of a separate part welded to the blade profile. Alternatively, the extruded section may be upset axially at the tip to provide material for machining an integral tip platform.

Preferably a split die is used for the extrusion which will facilitate the extrusion by pressure in a single sense.

As filler material there may be used a low-carbon steel that is to say a steel containing 0.1% or less of carbon.

A suitable lubrication for the billet during extrusion may be obtained by nickel plating the billet and/or by the use of powdered glass.

An example of this invention will be described by reference to the accompanying drawing.

FIGURE 1 is an elevation of a blade according to this invention.

FIGURE 1A is a view of the same blade in a direction at right angles to that of FIGURE 1.

FIGURE 2 is a vertical section through the billet from which the blade is to be extruded after the blind holes have been drilled.

FIGURE 2A is a section on the line IIA—IIA of FIGURE 2.

FIGURE 3 is an end view of one-half of the extrusion die.

FIGURE 3A shows the same one-half of the die in plan.

FIGURE 3B is a section through the two halves of the die on a plane at right angles to the two die faces.

FIGURE 4 is an elevation of the billet after extrusion.

FIGURE 4A is a section on the line IVA—IVA of FIGURE 4.

FIGURE 5 shows in full lines the blade section of the extruded billet after extrusion and in dotted lines the same blade section after it has been twisted.

FIGURES 6 and 6A are diagrams showing the effect on the drilled holes of the method of extrusion applied according to this invention, and FIGURES 7 and 7A correspond to FIGURES 1 and 1A and show on a larger scale the root and adjacent portions of the blade illustrated in FIGURES 1 and 1A.

A billet 10 is formed from a cut bar by forging. Blind holes 11 are then drilled in it. Rods of low carbon steel having substantially the same resistance to deformation as the material of the blade are inserted in the holes and are located by welding at the open ends of the holes. The billet is then nickel plated to provide lubrication during extrusion and then heated and extruded in a split die, two halves of which are shown at 12 and 13. During extrusion the reduction of cross-sectional area takes place substantially wholly at right angles to the plane of the die split.

On removal from the die the billet has the shape shown in FIGURES 4 and 4A. The effect of the extrusion is to deform the round holes 11 into the shape shown in FIGURE 6A, as a result of the extrusion pressure exerted in the direction of the arrows shown in FIGURE 6.

The billet on removal from the die has a blade portion 14 and a portion 15 from which the root and root platform will be formed.

The next step is to twist the blade portion 14 to occupy the position shown in dotted lines 15a as shown in FIGURE 5 to provide the required angle of incidence in the completed blade.

The final stages of manufacture are to shape the root portion 15 to the desired shape with the fir tree fixing portion 16 and the inclined root platform 17, to machine the blade profile to final shape, and to drill holes 18 through the root to connect up with the holes 11. The carbon steel rods may be removed at any time after extrusion. Since they are of a material less resistant chemically than that of the blade itself they may be dissolved as by nitric acid. The machining operation is one to form the blade surfaces to their final accurate shape and finish and is performed on suitable machines in a known manner.

The nickel plating will also be removed.

Where the blade carries a tip portion 19 as shown in FIGURES 1 and 1A this may be welded on to the end or alternatively the tip of the blade portion 15 of the billet may be upset to provide material for machining an integral tip portion.

The twisting operation could alternatively be carried out during extrusion by shaping the extrusion die appropriately. In this case the extrusion die would have to be a split die.

The holes 11 could be drilled at angles to the longitudinal axis of the billet such that the holes converge towards each other as they approach the tip of the billet.

Also the holes 11 could be internally tapered so that the cross-sectional area of the holes decreases as they approach the tip of the billet.

We claim:

1. The method of forming a blade unit for an internal combustion turbine engine from a metal which is resistant to high temperature, the blade being of the type which has a blade portion twisted or off-set from the root fixing portion and cooling passageways running lengthwise of the blade having open ends at the blade root and blade tip, which method includes the following steps:

(a) producing a billet having two parallel sides, (b) drilling a plurality of blind holes axially of the billet in only the portion to become the blade section, (c) inserting filler material into all of the drilled holes, (d) partially extruding the billet in a die by pressure exerted substantially wholly normal to said two sides and thus along one diameter only of each of the said drilled holes thereby to produce a blade section of approximate aerodynamic form leaving an integral undrilled portion of the billet remaining to form the root-fixing portion, said holes thereby being deformed in the profile portion to be of elongated or lenticular cross-section, said extrusion causing the required twisting of the profile portion of the blade to give the required angle of incidence, (e) machining the blade profile portion to final shape and machining the root-fixing portion from the remaining non-extruded imperforate portion of the billet, (f) removing said filler at a stage in the manufacturing process subsequent to extrusion, and (g) drilling holes longitudinally through the root-fixing portion to register with the inner ends of the blind holes.

2. The method claimed in claim 1 in which the extruded section is upset axially at the blade tip to extend material thereof laterally from which an integral tip platform can be machined.

3. The method claimed in claim 1 in which the extrusion operation is caused to form an inclined surface on the non-extruded portion of the billet where the profiled blade part projects and then forming a root platform below this surface and above the root fixing portion from said non-extruded part.

References Cited in the file of this patent

UNITED STATES PATENTS

| | | |
|---|---|---|
| 1,430,399 | Parsons et al. | Sept. 26, 1922 |
| 1,748,364 | Ray | Feb. 25, 1930 |
| 1,998,393 | Junggren | Apr. 16, 1935 |
| 2,013,622 | Bedford et al. | Sept. 3, 1935 |
| 2,205,132 | Blanchart | June 18, 1940 |
| 2,389,876 | Sequin | Nov. 27, 1945 |
| 2,681,500 | Whitehead | June 22, 1954 |
| 2,767,460 | Schultz | Oct. 23, 1956 |
| 2,799,918 | Goldthwaite et al. | July 23, 1957 |
| 2,830,357 | Tunstall et al. | Apr. 15, 1958 |

FOREIGN PATENTS

| | | |
|---|---|---|
| 569,514 | Great Britain | May 28, 1946 |
| 755,610 | Great Britain | Aug. 22, 1956 |
| 763,141 | Great Britain | Dec. 5, 1956 |
| 1,072,391 | France | Mar. 17, 1954 |